Nov. 4, 1930.  D. H. ROWLAND  1,780,246

GLASS INSULATOR AND METHOD OF MAKING SAME

Filed Dec. 9, 1924

Inventor
Daridge H. Rowland
By
his Attorney

Patented Nov. 4, 1930

1,780,246

UNITED STATES PATENT OFFICE

DAVIDGE H. ROWLAND, OF BALTIMORE, MARYLAND, ASSIGNOR TO LOCKE INSULATOR CORPORATION, OF BALTIMORE, MARYLAND, A CORPORATION OF MARYLAND

GLASS INSULATOR AND METHOD OF MAKING SAME

Application filed December 9, 1924. Serial No. 754,746.

The invention relates to glass insulators and methods of making the same.

The primary object of the invention, generally considered, is to provide a method of making Hewlett type insulators of glass.

Ordinarily, insulators of this type are made of porcelain or other vitreous material and while the molded insulator is still in a somewhat plastic condition curved holes are cut therethrough, which holes or passages interlink and are intended for the reception of suspension and connecting elements whereby a series of units may be connected together to form a string. In making an insulator of this type of glass it is obvious that it is impossible to cut the curved holes or passages for the reception of the suspension elements and it becomes necessary to resort to some other expedient. I am aware that insulators of the pin type have been made of glass with the pin embedded therein but in all cases where a metallic element is tightly embedded within glass there are severe strains and stresses set up on account of the difference in the coefficients of expansion of metal and glass, and during extreme changes in temperature conditions the glass frequently breaks.

The object of the present invention, more specifically stated, is to provide a method of making Hewlett type insulators of glass and in which the suspension elements are loosely mounted or embedded, the carrying out of the method involving the application of heat to or the generation of heat within the metallic suspension elements whereby they will be caused to expand to an appreciable extent while the glass is being molded about them so that upon subsequent cooling and shrinkage of the insulator the suspension elements will fit within the holes or passages with sufficient looseness that any ordinary temperature changes to which the unit may be subjected in service will not cause sufficient expansion to result in binding of the suspension elements within the insulator body, this looseness also permitting the successive units of a string to accommodate themselves automatically to the line of tension so that they will be arranged co-axially when in depending condition.

Another object of the invention is to provide an insulator of the Hewlett type within which the metallic suspension elements may be permanently though loosely mounted so that they will always be in place ready for connection by appropriate means to form a string.

Broadly speaking, the method consists in molding a glass body about interlinking suspension links or members held in proper relation, the links or suspension members having the temperature thereof raised preferably to a point sufficient to expand them so that upon cooling and shrinking they will fit loosely within the body. While various means may be employed for carrying out the method, I have, for the sake of clearness, disclosed a suitable means illustrated in the accompanying drawings, in which.

Throughout the specification and drawings like parts are designated by like reference characters.

Figure 1:
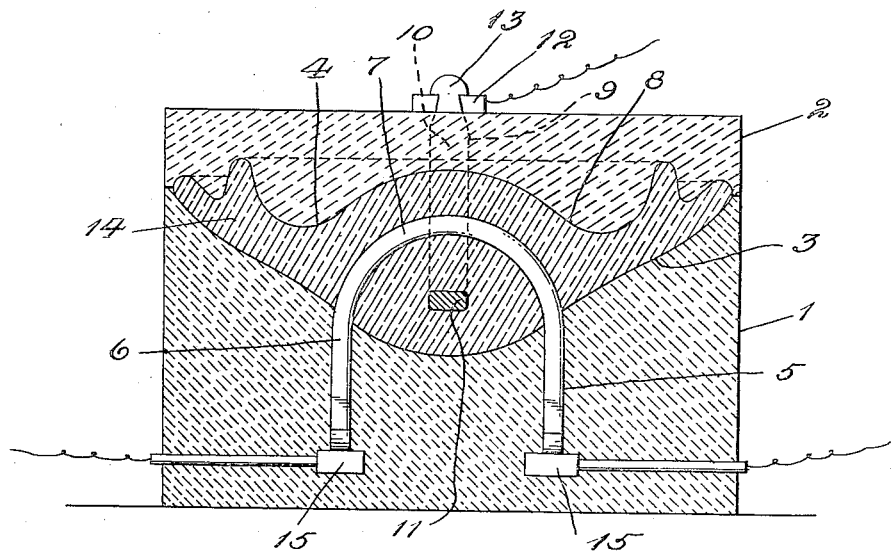
Figure 1 is a cross section through a suitable mold, illustrating the method of making an insulator in accordance with my invention.
Figure 2:
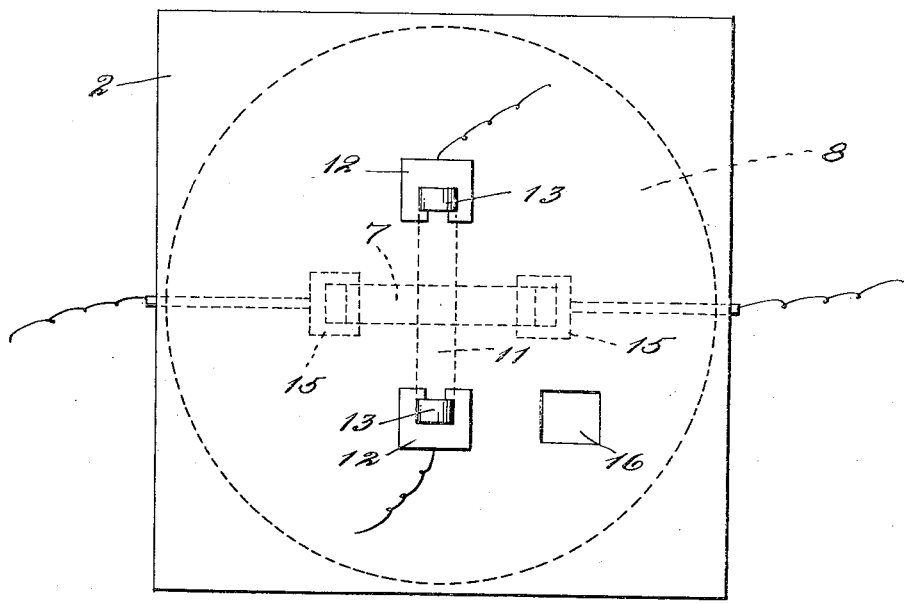
Figure 2 is a plan view.

Referring to the drawings in detail, the numerals 1 and 2 designate suitable mold elements or members having their confronting faces recessed and shaped, as shown at 3 and 4, respectively, to correspond to the upper and lower surfaces of the type of insulator to be made. The particular configuration disclosed is merely for illustrative purposes as it is obvious that variations may be made therein if desired. The mold elements may, themselves, be of any size and shape, depending upon circumstances, and may be constructed of the usual or any preferred material appropriate for the purpose. The mold members are relatively movable and one, preferably the lower, is stationary and serves as a support.

The lower mold member 1 may be provided with holes 5 to receive the arms of a curved or substantially U-shaped metallic suspension element 6 which has its bight portion 7 projecting into the cavity 8 defined between the mold members, and the upper mold member 2 is formed with holes 9 through which pass the arms of another similar suspension element 10 which is located at right angles to the member 6 and which has its bight portion 11 projecting into the cavity 8 and interlinking with the bight portion 7 of the member 6 but in spaced relation thereto. Any suitable means may be provided for suspending the member 10 in proper position, and for the sake of illustration I have shown notched or slotted blocks 12 on top of the member 2 engaging beneath heads 13 on the ends of the arms of the member 10, which heads may have any desired configuration and which are provided for the purpose of engagement with suitable connecting elements, not shown, whereby the suspension members of successive units may be connected to form a string.

An important feature involved in my method is the heating of the members 6 and 10 prior to or while the glass insulator body 14 is molded in the cavity 8 in embedding relation to these members. Obviously, this might be carried out in any one of various ways though a convenient method is to provide conducting members 15 within the lower mold member 1 at the bottoms of the holes 5 so that the arms of the member 6 will rest upon them. The members 12 are likewise conductors. Current may be supplied to the members 15 and 12 so that the resistance of the suspension members to the passage of the current will result in generation of heat. In actual practice the suspension members will probably be heated to redness while the glass body is molded in the cavity. While any means might be provided for introducing or permitting the introduction of the molten glass within the cavity 8, I have shown the upper mold member as provided with an opening 16 through which the glass may be poured. After cooling, the members 12 are removed, the mold member 2 lifted off and then the molded insulator with the links therein lifted out. On account of the shrinkage occurring during cooling, the suspension members or links will fit loosely within the body and any rise in temperature which may occur in service will be insufficient to cause expansion of the suspension members to such an extent as to cause them to bind within the body. Likewise, a decrease in temperature will have no injurious effect. Owing to the fact that the embedding of the suspension links within the body forms the curved interlinking passages, it is apparent that the walls of these passages conform to the shape of the links and in this way a smooth bearing surface is provided which will avoid the bringing of any undue strain upon the body of the insulator due to high spots within the passages. The suspension links might be made of such shape as to be capable of subsequent withdrawal from the passages though it may be preferable to have them of such construction and shape as to remain permanently attached to the insulator body though loose with respect thereto, such variations and modifications being within the scope of the invention.

Obviously, the mold members may each be formed of any desired number of parts and the material may be of any nature suitable for the purpose, though if the mold be metallic or of other conducting material, it would naturally be necessary to provide some means for insulating the links and contacts or terminals from the body of the mold.

Having now described my invention, what I claim is:

1. The method of making an insulator equipped with suspension means, consisting in molding the glass about suspension elements and at the same time applying heat to the suspension elements for effecting expansion thereof until the glass has set.

2. The method of making a glass insulator equipped with interlinking suspension means, consisting in molding a glass body about the interlinking suspension means, and applying heat to the suspension means to effect expansion thereof until after the glass has set whereby upon subsequent cooling and shrinkage the suspension means will fit loosely within the body.

3. The method of making a glass insulator of the Hewlett type consisting in molding a glass body about suspension members arranged in interlinking relation, and at the same time heating the suspension members until after the glass has set.

4. The method of making of glass an insulator of a type equipped with a suspension member, consisting in molding a glass body about a suspension member and continuously heating the suspension member until after the glass has set.

5. The method of making of glass an insulator of the suspension type and equipped with a curved suspension link, consisting in molding a glass body about a suspension link whereby the link will be partially embedded within the body, and heating the link until after the glass has set.

6. The method of making of glass an insulator of the suspension type and equipped with a curved suspension link, consisting in molding a glass body about a suspension link whereby the link will be partially embedded within the body, and continuously heating the suspension link until after the glass has ceased to flow.

7. The method of making a suspension insulator of glass, consisting in interlinking suspension members, molding a glass body about the members to embed the interlinking portions thereof, and heating said members during the molding and until after the glass has lost its plasticity.

8. The method of making a glass suspension insulator, consisting in arranging curved suspension members in interlinking relation, heating said members and at the same time molding a glass body about the interlinking portions of said members, and continuing the heating of said members until after the glass has set.

9. The method of making an insulator of a type having a permanently attached suspension element, comprising molding a glass body about said suspension element and passing an electric current through the element to effect heating thereof during molding, and continuing said heating until after the glass has set.

10. The method of making an insulator of a type having a suspension element permanently carried thereby, comprising expanding the suspension element, casting vitreous material about a portion of the element, and maintaining the expanded condition of the element until after the vitreous material has lost its plasticity.

In testimony whereof I affix my signature.

DAVIDGE H. ROWLAND.